UNITED STATES PATENT OFFICE.

WILLIAM M. WELLING, OF NEW YORK, N. Y.

IMPROVEMENT IN ARTIFICIAL IVORY.

Specification forming part of Letters Patent No. 77,938, dated May 12, 1868; antedated May 2, 1868; reissue No. 5,940, dated June 30, 1874; application filed June 16, 1874.

*To all whom it may concern:*

Be it known that I, WILLIAM M. WELLING, of the city and State of New York, have invented and made a certain new and useful Improvement in Artificial-Ivory Composition, and I do hereby declare the following to be a full, clear, and exact description of the said invention, and of the features which distinguish the same from previous compounds.

This composition is adapted to use in the manufacture of billiard balls, harness-rings, and many other articles of a useful or ornamental character heretofore made of ivory.

In Letters Patent, granted to me, August 4, 1857, an artificial-ivory composition is described, and also the mode in which the same is compounded and prepared. The ingredients composing my present composition are prepared by finely pulverizing, mixing, heating, grinding, and molding, in substantially the manner set forth in said Letters Patent, but the materials employed vary.

I make use of shellac and talc as the principal ingredients of my compound, and I find it advantageous to make use of camphor as tending to toughen the compound, but I do not limit myself in this particular.

The following proportions I prefer: Shellac, about sixteen parts, by weight; camphor, about one part, by weight; talc, about sixteen parts, by weight.

These substances are to be mixed, heated, ground, and molded when in a heated state, and the article formed is very strong, resembling ivory, but it is more durable under many circumstances, in view of being uninjured by water and but little affected by acids.

Various colors may be produced by the addition of pigments, such as vermillion, white lead, impalpable white, &c.

What I claim, and desire to secure by Letters Patent, is—

The composition herein specified, prepared substantially as set forth.

Signed by me this 11th day of June, A. D. 1874.

WM. M. WELLING.

Witnesses:

GEORGE SERRELL,

GEO. T. PINCKNEY.